(12) United States Patent
Rantakokko et al.

(10) Patent No.: US 9,778,740 B2
(45) Date of Patent: Oct. 3, 2017

(54) METHOD AND SYSTEM FOR TRACKING AN INTEREST OF A USER WITHIN A PANORAMIC VISUAL CONTENT

(71) Applicant: Finwe Oy, Oulu (FI)

(72) Inventors: Tapani Rantakokko, Oulunsalo (FI); Juha Kela, Oulu (FI); Mikko Polojarvi, Oulu (FI); Lauri Pohjanheimo, Kiiminki (FI); Esko-Juhani Malm, Oulu (FI); Minna Rahkola, Oula (FI); Tommi Einola, Oulu (FI)

(73) Assignee: FINWE OY, Oulu (FI)

( * ) Notice: Subject to any disclaimer, the term of this patent is extended or adjusted under 35 U.S.C. 154(b) by 222 days.

(21) Appl. No.: 14/683,706

(22) Filed: Apr. 10, 2015

(65) Prior Publication Data

US 2016/0301862 A1    Oct. 13, 2016

(51) Int. Cl.
*H04N 5/232* (2006.01)
*G06F 3/01* (2006.01)
*G06Q 30/02* (2012.01)

(52) U.S. Cl.
CPC .............. *G06F 3/011* (2013.01); *G06F 3/012* (2013.01); *G06F 3/013* (2013.01); *G06Q 30/0241* (2013.01)

(58) Field of Classification Search
None
See application file for complete search history.

(56) References Cited

U.S. PATENT DOCUMENTS

| | | | | |
|---|---|---|---|---|
| 2005/0273830 A1* | 12/2005 | Silver | .................. | H04N 5/4401 725/105 |
| 2007/0116119 A1* | 5/2007 | Wang | .................... | H04N 19/503 375/240.12 |
| 2010/0182396 A1* | 7/2010 | Kroepfl | .................... | G01S 19/14 348/36 |
| 2012/0120186 A1* | 5/2012 | Diaz | ..................... | H04N 5/2258 348/36 |
| 2014/0160248 A1* | 6/2014 | Pomerantz | .............. | G06F 1/163 348/47 |
| 2014/0160250 A1* | 6/2014 | Pomerantz | ......... | H04N 5/23229 348/47 |
| 2014/0199050 A1* | 7/2014 | Khalsa | .................. | G11B 27/031 386/280 |
| 2014/0249961 A1* | 9/2014 | Zagel | .................. | G06K 9/00369 705/26.61 |

(Continued)

*Primary Examiner* — Mohammad J Rahman
(74) *Attorney, Agent, or Firm* — Ziegler IP Law Group, LLC

(57) ABSTRACT

Disclosed is a method for tracking an interest of a first user within a panoramic visual content. The method comprises presenting the panoramic visual content to the first user on a display area of a device and determining a first view point within the panoramic visual content at a first timestamp, and a second view point within the panoramic visual content at a second timestamp. The method also comprises determining at least one orientation parameter for the first view point at the first timestamp and the second view point at the second timestamp relative to each other and computing the interest of the first user within the panoramic visual content using the at least one orientation parameter.

20 Claims, 14 Drawing Sheets

(56) References Cited

U.S. PATENT DOCUMENTS

| | | | |
|---|---|---|---|
| 2015/0058102 A1* | 2/2015 | Christensen | G11B 27/11 705/14.6 |
| 2015/0279426 A1* | 10/2015 | Maurer | G11B 27/28 386/241 |
| 2015/0302633 A1* | 10/2015 | Li | G06T 15/10 345/419 |
| 2015/0348580 A1* | 12/2015 | van Hoff | G11B 19/20 348/38 |
| 2016/0080485 A1* | 3/2016 | Hamedi | H04L 67/02 709/204 |

* cited by examiner

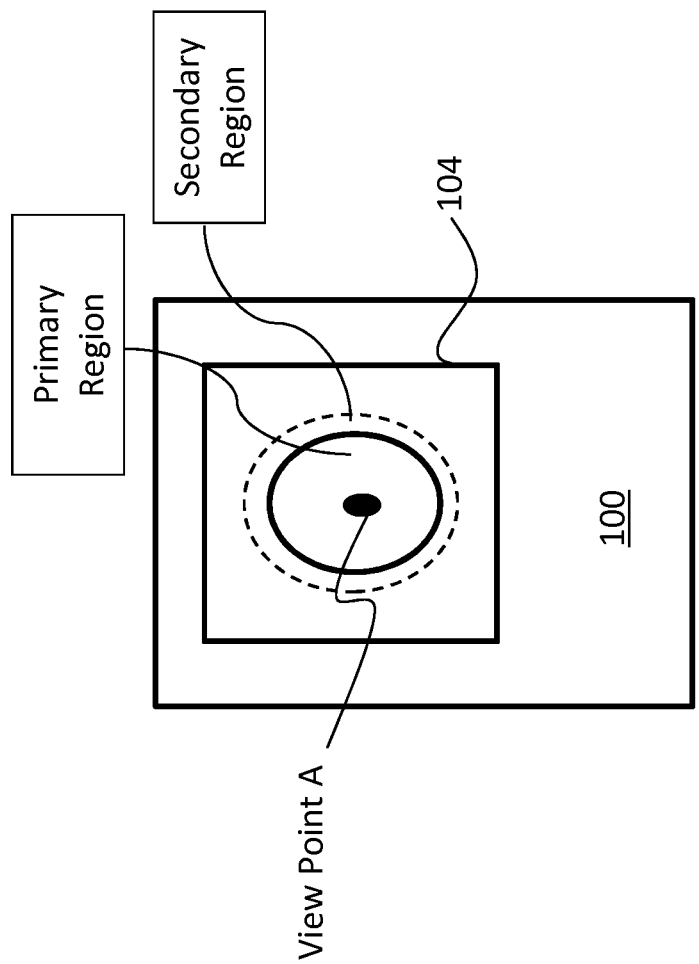

METHOD AND SYSTEM FOR TRACKING AN INTEREST OF A USER WITHIN A PANORAMIC VISUAL CONTENT

TECHNICAL FIELD

The present disclosure relates generally to activity based monitoring methods and systems; and more specifically, to methods and systems for tracking an interest of a user within a panoramic visual content.

BACKGROUND

A panoramic visual content such as an image or a video includes visual information which is covered over a large field of view. Various players provide a user interface to view the panoramic visual content on a display screen of a device. The user interface enables the user to navigate across one or more portions of the panoramic visual content. The panoramic view of the visual content offers several challenges and opportunities to content creators. For example, the panoramic view enables the user to control the view of the video and the user may be navigating other portions of the video rather than viewing creator's selected portion of the video at a particular timestamp. As a result, it is critical for the content creators to monitor user's viewing activity within the panoramic visual content so as to create an interactive and commercially successful panoramic visual content.

There exists eye gazing devices such as smart contact lenses or head mounted devices to monitor the user's viewing activity within the panoramic visual content. Typically, these eye gazing devices monitor the movements associated with the eyes and identify the area of the display screen to determine the viewing activity within the panoramic visual content. However, the users are required to wear these devices to record their viewing activities which make these devices unpopular among large number of users in a society. Further, these eye gazing devices are complex in operation and require additional computing resources. Moreover, these devices can amount additional financial burden on the content creators if they have to record the viewing activity of the large number of users in the society. Further such monitoring devices are typically limited to laboratory or specific test environments resulting to biased or unnatural test results.

Therefore, in light of the foregoing discussion, there exists a need to provide a method and system for efficiently track the viewing activity of large number of users in the society.

SUMMARY

The present disclosure seeks to provide a method for tracking an interest of a user within a panoramic visual content.

The present disclosure also seeks to provide a system for determining an interest of a group of the users within the panoramic visual content.

In one aspect, an embodiment of the present disclosure provides a method for tracking an interest of a first user within a panoramic visual content. The method comprises the steps of:
  presenting the panoramic visual content to the first user on a display area of a device;
  determining a first view point within the panoramic visual content at a first timestamp, and a second view point within the panoramic visual content at a second timestamp;
  determining at least one orientation parameter for the first view point at the first timestamp and the second view point at the second timestamp relative to each other; and
  computing the interest of the first user within the panoramic visual content using the at least one orientation parameter.

In another aspect, an embodiment of the present disclosure provides a method for determining interest of users within a panoramic visual content. The method comprises the steps of:
  receiving interest tracking information of at least two users for the panoramic visual content, wherein the interest tracking information of a first user is determined based on at least one orientation parameter computed for first and second view-points at a first device according to aforementioned method; and
  combining the interest tracking information of the at least two users to generate a heat map, wherein the heat map corresponds to a plurality of portions of the panoramic visual content which are of interest to the at least two users.

In yet another aspect, an embodiment of the present disclosure provides a system for determining interest of users within a panoramic visual content. The system comprises:
  a first computing device comprising a panoramic visual content tracker configured to:
    present the panoramic visual content to a first user on a display area of a device;
    determine a first view point within the panoramic visual content at a first timestamp and a second view point within the panoramic visual content at a second timestamp;
    determine at least one orientation parameter for the first view point at the first timestamp and the second view point at the second timestamp relative to each other; and
    compute the interest of the first user within the panoramic visual content using the at least one orientation parameter;
  and
  a tracking server configured to:
    combine the interest of the first user within the panoramic visual content with an interest of a second user for the panoramic visual content; and
    generate a heat map indicating a plurality of portions of the panoramic visual content which are of interest to the first and second users.

Embodiments of the present disclosure substantially eliminate or at least partially address the aforementioned problems in the prior art, and enable efficient tracking of the interest of the users within the panoramic visual content.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 5 is an illustration indicating a region of interest associated with the view point of the panoramic visual content, in accordance with an embodiment of the present disclosure;

Figure 1:
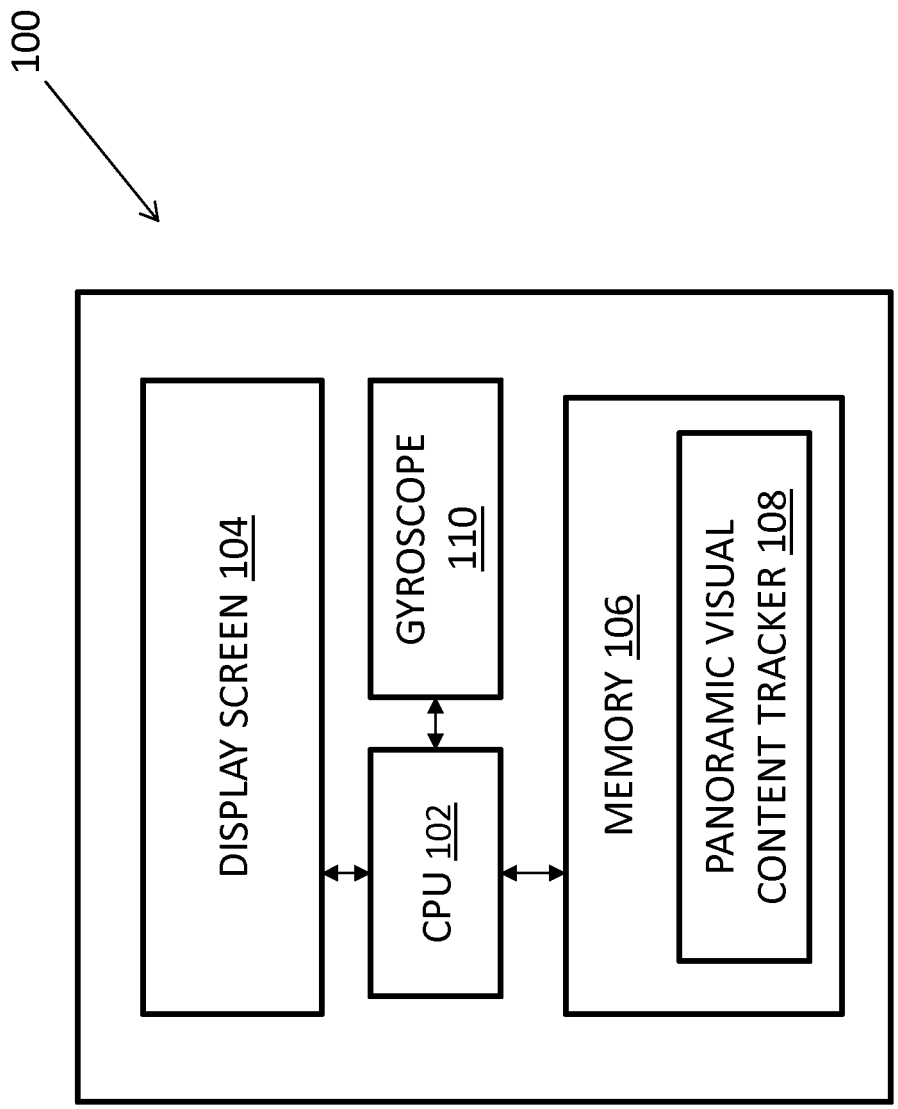
FIG. 1 is a schematic illustration of a device configured to track an interest of a user within the panoramic visual content, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for tracking an interest of a first user within a panoramic visual content. The method comprises the steps of:
  presenting the panoramic visual content to the first user on a display area of a device;
  determining a first view point within the panoramic visual content at a first timestamp, and a second view point within the panoramic visual content at a second timestamp;
  determining at least one orientation parameter for the first view point at the first timestamp and the second view point at the second timestamp relative to each other; and
  computing the interest of the first user within the panoramic visual content using the at least one orientation parameter.

In another aspect, an embodiment of the present disclosure provides a method for determining interest of users within a panoramic visual content. The method comprises steps of:
  receiving interest tracking information of at least two users for the panoramic visual content, wherein the interest tracking information of a first user is determined based on at least one orientation parameter computed for first and second view-points at a first device according to aforementioned method; and
  combining the interest tracking information of the at least two users to generate a heat map, wherein the heat map corresponds to a plurality of portions of the panoramic visual content which are of interest to the at least two users. In yet another aspect, an embodiment of the present disclosure provides a system for determining interest of users within a panoramic visual content. The system comprises:
  a first computing device comprising a panoramic visual content tracker configured to:
    present the panoramic visual content to a first user on a display area of a device;
    determine a first view point within the panoramic visual content at a first timestamp and a second view point within the panoramic visual content at a second timestamp;
    determine at least one orientation parameter for the first view point at the first timestamp and the second view point at the second timestamp relative to each other; and compute the interest of the first user within the panoramic visual content using the at least one orientation parameter; and a tracking server configured to:
combine the interest of the first user within the panoramic visual content with an interest of a second user for the panoramic visual content; and
generate a heat map indicating a plurality of portions of the panoramic visual content which are of interest to the first and second users.

The present disclosure pertains to methods and systems for tracking interests of the users within the panoramic visual content. In an embodiment, the panoramic visual content can be an audio-visual content (the audio-visual content can originate from any source including, but not limited to virtual reality graphics, real world video content i.e. content created with cameras and real environment, and combination of virtual reality and real world videos), a video, an image and combination thereof which is presented to the user in a panoramic view. The methods and systems disclosed herein track the viewing activity of the user on a display area of a device. The device includes but is not limited to a computing device, such as a laptop, a desktop, a mobile device, a smart phone, a web pad, a smart wearable appliance, a television, an automotive entertainment system, and an augmented or virtual reality device, which can be configured to display one or more portions of the panoramic visual content to the user.

In addition, the device comprises one or more input interfaces enabling the user to selectively view the panoramic visual content in any direction in accordance with his interest. In an example, the panoramic visual content can be represented with a 360° horizontal field of view (HFOV) and a 180° vertical field of view (VFOV) with an aspect ratio of 2:1. Further, the device is configured to display the panoramic visual content in an equi-rectangular (360°×180°) view from a single point of reference. In another example, the panoramic visual content can be represented with rectilinear projection of the audio-visual content. The rectilinear projection is represented in a display of the device.

In an embodiment, the user may manually rotate or drag the panoramic visual content in any direction using a touch interface, a keyboard, a joystick, or a mouse. In another embodiment, the user may utilize a smart wearable device or a head mounted virtual reality device including one or more motion detection sensors in order to selectively view the panoramic visual content relative to the motion of the user. These devices can be configured to monitor head movements of the user to display and/or project one or more portions of the panoramic visual content that can be an indicative of the interest of the user. In another embodiment, the user may manually rotate the panoramic visual content in any direction by changing orientation of the device configured to display the content. The orientation of the device can be detected for example by one or more motion sensors such as accelerometer, gyroscope, magnetometer and visual detection means. In addition information from two or more sensors can be combined to make orientation detection.

While viewing the panoramic visual content on the display area of the device, the device is configured to determine a first view point within the panoramic visual content at a first timestamp and a second view point within the panoramic visual content at a second timestamp. For example, a view point A is determined within the panoramic visual content at a timestamp T1 and a view point B is determined within the panoramic visual content at a timestamp T2. In an embodiment, the first view point or the second view point corresponds to a point of interest of the user within the panoramic visual content at the first timestamp or second timestamp respectively.

According to an embodiment, the method further comprises defining a primary region of the display area of the device, wherein at least one of the first view point and the second view point is within the primary region. This primary region may indicate a portion of the panoramic visual content which is of interest to the first user. Furthermore, defining the primary region may comprise defining dimensions for the primary region, wherein the dimensions comprise at least two of a horizontal field of view, a vertical field of view and an aspect ratio.

Further, the device is configured to determine one or more orientation parameters for the first and second view-points relative to each other. In an embodiment, the one or more orientation parameters can be a horizontal parameter, a vertical parameter, an axial parameter or a combination thereof. For example, the horizontal parameter is a yaw angle, the vertical parameter is a pitch angle and the axial parameter is a roll angle. In an embodiment, an origin (0, 0) is assigned to the centre of the panoramic visual content. As a result, a full spherical panoramic visual content can be covered using the yaw angle ranging from −180° to +180° (HFOV) and the pitch angle ranging from −90° to +90° (VFOV). In an embodiment, the orientation parameters such as the yaw angle, the pitch angle and the roll angle are stored with quaternions.

The present method further comprises, according to an embodiment, storing the at least one orientation parameter for the first view point at the first timestamp and the second view point at the second timestamp relative to each other, and computing eye gazing track of the first user based on the at least one orientation parameter. The device is thus configured to compute the point of interest of the user within the panoramic visual content using the one or more orientation parameters determined for the first and second view-points respectively. As the first and second view-points correspond to the user's points of interest within the content, the tracking of these view-points for a predetermined time period can be an indicative of an eye gazing track for the user. Subsequently, the device is configured to store the one or more orientation parameters for these view-points and compute the eye gazing track of the user within the panoramic visual content.

According to yet another embodiment, the method comprises also determining at least one video timing value for the first view point at the first timestamp and the second view point at the second timestamp, and computing the interest of the first user within the panoramic visual content using the at least one orientation parameter and the at least one video timing value. The device can thus be configured to determine a video timing value for the first view point at the first timestamp and the second view point at the second timestamp. For example, the device may identify that at the timestamp T1, the video timing value for the first view point is 1:35 minutes of the total movie length and at the timestamp T2, the video timing value for the second view point is 1:55 minutes of the total movie length. Subsequently, the device is configured to utilize the one or more orientation parameters and the respective video timing values to track the viewing activity of the user within the panoramic visual content.

In an embodiment, the device is configured to define more than one regions on the display area such that the first and second view-points are found within the more than one regions at the respective timestamps. The regions can be an indicative of regions of interest of the user on the display area. In an embodiment, the one or more regions include a primary region of the display area of the device. The present disclosure assumes that the primary region of the display screen is the focus area of the user. The visual content appeared within this primary region of the display screen over the time period can indicate the interest pattern for the contents of the panoramic visual content.

In an embodiment, the primary region is a central region of the display area. In another embodiment, the primary region is a central region of a portion of the display area of the device. Alternatively, the primary region is a user defined region on the display area of the device. In an embodiment, the one or more dimensions can include a horizontal field of view, a vertical field of view and an aspect ratio for the region in the display area. For example, the primary region includes an area covered by a circle having a centre point at X=(number of pixels in vertical direction)/2, Y=(number of pixels in horizontal direction)/2. The circle can have the radius varying from 0.05×(number of pixels in vertical direction) to 0.20×(number of pixels in vertical direction). In another example, the primary region includes an area covered by a square with midpoint as X, Y. The length of the square varies from 0.1×(number of pixels in vertical direction) to 0.20×(number of pixels in vertical direction) and the horizontal side of the square varies from 0.1×(number of pixels in horizontal direction) to 0.20×(number of pixels in horizontal direction). Further, the device is configured to define one or more dimensions for the one or more regions respectively. In addition, the roll angle of the device is determined as the additional dimension for the region when the device is tilted.

Further, the device is configured to define a secondary region on the display area of the device such that the primary region has a relatively higher importance than the secondary region from the user's interest perspective. In an embodiment, the primary region of the display area of the device can refer to an area covered by a circle with centre point at X=(number of pixels in vertical direction)/2 and Y=(number of pixels in horizontal direction)/2 with a radius varying from 0.05×(number of pixels in vertical direction) to 0.20× (number of pixels in vertical direction). The secondary region can refer to an area of the display which corresponds to area covered by another circle, with the same centre point of X=(number of pixels in vertical direction)/2 and Y=(number of pixels in horizontal direction)/2 with a radius varying from 1-4 times radius of the primary region area, but excluding the area of the primary region area. Further primary region and secondary region can be of any shape such as oval, square, closed polygon.

Subsequently, the device is configured to track the panoramic visual content that appeared within the one or more regions of the display area for a predetermined time period and store the viewing activity of the user in the device. As discussed, the viewing activity can be recorded using orientation parameters of the each view point, timestamp associated with the view point, and dimensions of the primary or secondary regions around the view point. In case of the panoramic video, the timing values of the video for each of the view-points are also recorded. Such information stored for a predetermined period enables reproducing of the viewing activity of the user.

In an embodiment, the method comprises generating a heat map indicating a track of plurality of portions of the panoramic visual content which are of interest to the first user, wherein each portion of the plurality of portions of the panoramic visual content is found within at least one region of the display area at different timestamps. The device may thus be configured to generate a heap map indicating the viewing activity of the user within the panoramic visual content. The heat map can be imposed on the visual content while the user accesses the visual content in the panoramic view. Further, the device is configured to provide a heat map comparison view to the user wherein the user can compare the different heat maps for the panoramic visual content.

The method may further comprise transmitting the computed interest of the first user to an interest tracking server. The device is thus preferably configured to transmit the viewing activity related information to a tracking server. For example, the device is configured to determine the primary region and the secondary region for each identified view point of the panoramic visual content at different timestamps and forward the information associated with the determined regions to the tracking server through a network. The network can be a wired, wireless, or a combination thereof. Examples of such network includes, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

According to another embodiment, the first view point or second view point corresponds to a point of interest of the first user within the panoramic visual content at the first timestamp or second timestamp respectively.

The tracking server can be configured to combine the tracked interest of the user within the panoramic visual content with interest of other users of the network and generate the heat map indicating a plurality of portions of the panoramic visual content which are of interest to the users of the network. In an embodiment, the heat map can be visualized by drawing a line graph on top of the panoramic visual content. Alternatively, the heat map can be visualized by drawing a properly scaled and tilted rectangle to illustrate the image area that indicates the past viewing activities of the users.

In an embodiment, the tracking server is configured to divide the complete area of the panoramic visual content into a plurality of small areas of equal size and assign a value to each of the smaller area. The value assigned to the area can be a quantitative indicator of the viewing activity in the area. Thus the areas having lower values have a relatively lesser viewing activity than the areas having higher values. In addition, lower values are mapped to one set of colours and higher values are mapped to another set of colours. Such colour based representation of the areas of the panoramic visual content can indicate the level of viewing activities of the users within the content. In an embodiment, the equal area presentation for the spherical panoramic visual content can be achieved by using geometrical form icosahedrons. Further, each of the icosahedron's triangular faces can be further sub-divided to smaller triangles and re-projected to follow the surface of a sphere in order to increase resolution of the heat map. In an embodiment, the heat map based visualizations can be imposed on the panoramic visual content for which the heat map request is made. As the panoramic visual content can be viewed as a full 360×180 (equi-rectangular) view, the heat map can be visualized on the top of the panoramic visual content in the similar format.

Otherwise, the snapshots of the recorded viewing activities of the user can be shown to the user.

In an embodiment, the method for determining interest of users further comprises receiving a request from the first user to access the heat map of the panoramic visual content, imposing the heat map on the panoramic visual content, and transmitting the panoramic visual content imposed with the heat map to the first user. A first user may thus request the tracking server to provide access to the past viewing activities of the other users for the panoramic visual content. The tracking server is configured to identify one or more attributes of the first user and identify other users of the network exhibiting attributes similar to the attributes of the first user. In an embodiment, the one or more attributes can include a geographical area, age, gender, and other common attributes among the first user and other users of the network. Subsequently, the tracking server is configured to filter the viewing activities in accordance with the one or more attributes of the user and transmit the filtered past viewing activity of other users to the first user.

According to an embodiment of the system for determining interest of users within a panoramic visual content, the panoramic visual content tracker is further configured to define a primary region on the display area of the device, wherein at least one of the first view point and the second view point is within the primary region. The panoramic visual content tracker may yet further be configured to define dimensions for the primary region, wherein the dimensions comprise at least two of a horizontal field of view, a vertical field of view and an aspect ratio. Still further, the panoramic visual content tracker can be further configured to determine at least one video timing value for each of the first and second view-points at the first and second timestamps respectively, and compute the interest of the first user within the panoramic visual content using the at least one orientation parameter and the at least one video timing value.

The methods and systems disclosed in the present disclosure offers several advantages. For example, monitoring of the viewing activities of the different users for can assist in determining products or services for which advertisements may be inserted within the panoramic visual content. The present disclosure further facilitates in determining placement of these advertisements at appropriate places within the panoramic visual content where the chances of viewing these advertisements are relatively higher. For example, the advertisements are placed in those portions of the panoramic visual content which have higher viewing activities. Further, the tracking server can be configured to determine cost of placing the advertisements at the identified portions of the panoramic visual content. In an example, the cost may be directly dependent on the viewing activity associated with the portion of the panoramic visual content. In addition, the tracking server is configured to insert the advertisements in the highly viewed portions of the content in accordance with the attributes and viewing pattern of the user.

Further, the present disclosure facilitates in determining interesting portions of the panoramic visual content. Based on the viewing patterns of the users, the methods and systems described herein can enable the tracking server to determine highly viewed and least viewed portions of the panoramic visual content.

The present disclosure also facilitates real time analysis of the panoramic visual content so that a content creator such as a director can receive feedback from the users on real time basis to improve the content and views in the panoramic visual content. Accordingly, the director can give instructions to camera men and actors on real time basis. Further, the present disclosure facilitates comparing two or more heat maps for the panoramic visual content enabling the director to improvise on the content accordingly. In addition, the director can share the heat map with the viewers too. Additionally, the determined interesting portions can be analysed with pattern recognition in order to provide to the users context sensitive marketing messages.

Further, the present disclosure facilitates the selection of the portions of the panoramic visual content that need to be selected while converting the 360 degrees video into a 2D video. The portions which have relatively higher viewing activities are selected and used for 2D conversion process. Such automatic selection of the portions of the panoramic visual content can be shared as a social TV channel. This channel enables the viewers to identify viewed portions of the panoramic visual content by the group of users in a specific geographical area. Further the present disclosure facilitates creation of "Social Directors Cut" i.e. selecting automatically which portion of the panoramic visual content are shown to a set of users which do not want to or their device does not enable the users to control the view point (portions) of the visual content. However, this feature provides an option to the user to follow for example view point of a group, a celebrity, professional movie director, friend etc.

DETAILED DESCRIPTION OF THE DRAWINGS

Referring now to the drawings, particularly by their reference numbers, FIG. 1 is schematic illustration of a device 100 configured to track the interest of the user within the panoramic visual content in accordance with an embodiment of the present disclosure. The device 100 comprises a central processing unit (CPU) 102, a display screen 104 and a memory 106. The memory 106 includes a panoramic visual content tracker 108 configured to track the viewing activity of a user on the display screen 104 of the device 100. Further, the device 100 includes a gyroscope 110 to determine orientation based movements of the user. Based on these movements, the device 100 is configured to track one or more portions of the panoramic visual content appeared on a central region of the display screen 104.

Figure 2A:
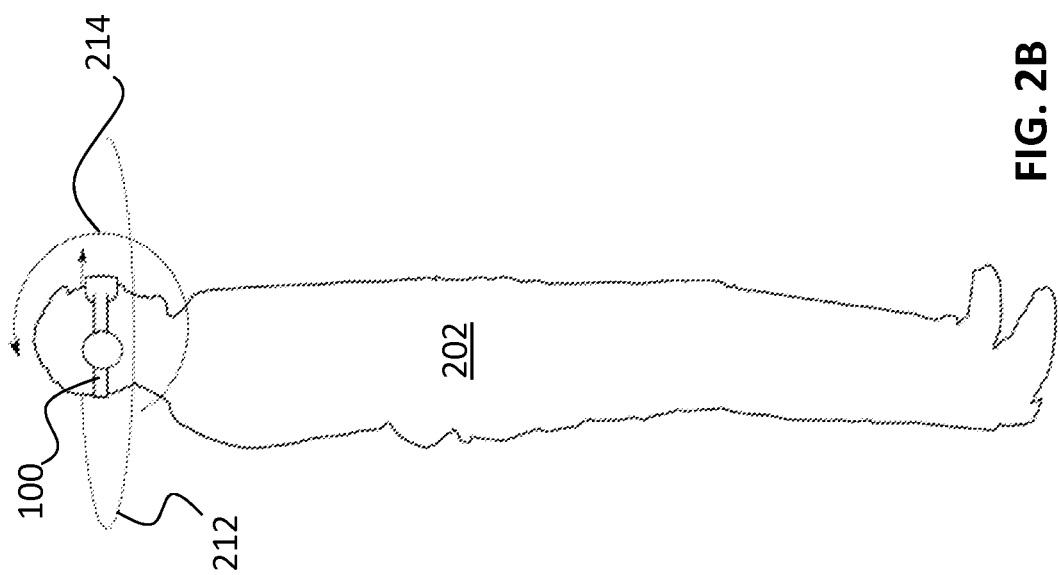
FIGS. 2A-B are schematic illustrations of a user accessing the device to control viewing of the panoramic visual content, in accordance with an embodiment of the present disclosure.
Figure 2B:
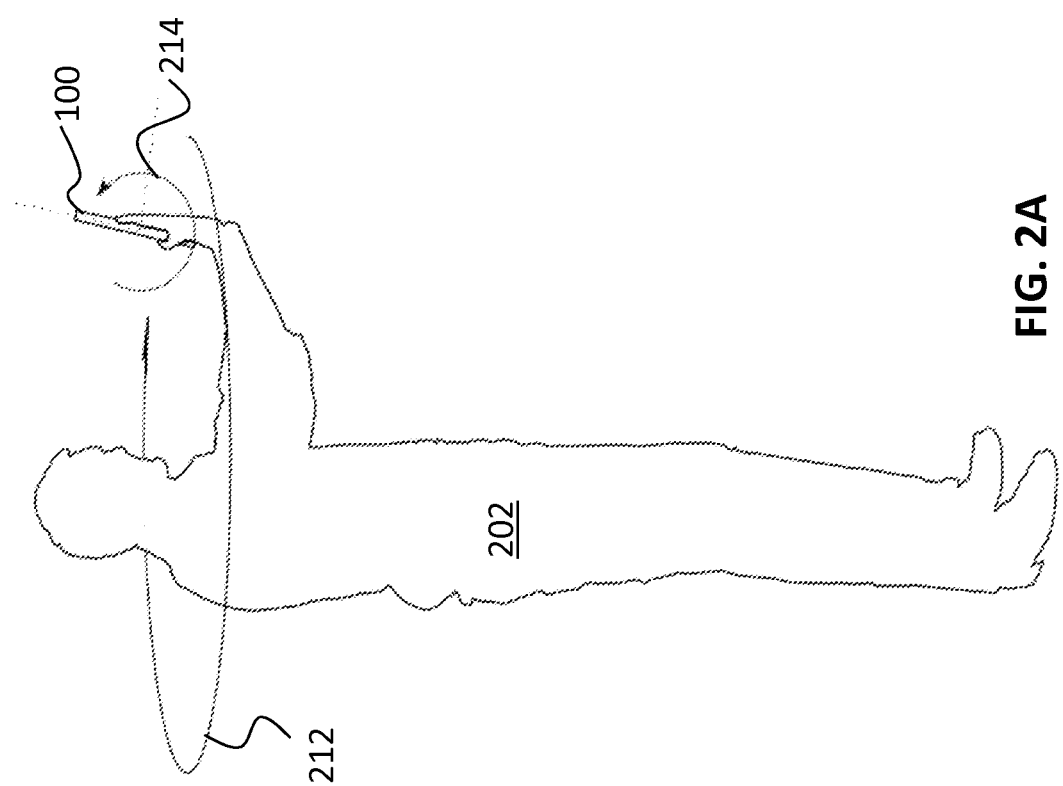

FIGS. 2A and 2B are illustrations of a user 202 accessing the device 100 to control the viewing of the panoramic visual content in accordance with an embodiment of the present disclosure. FIG. 2A illustrates the device 100 as a mobile tablet device including motion sensors for responding to the movements of the user 202. The device 100 enables the user 202 to pan the panoramic visual content by dragging it with a finger placed on the device's touch screen. The user 202 can turn his body around a horizontal orientation axis 212 or rotate the device 204 around a vertical orientation axis 214 to selectively view one or more portions of the panoramic visual content in horizontal or vertical directions respectively. FIG. 2B illustrates the device 100 as a head mounted virtual reality device which responds to the movements of the head of the user 202. The user 202 can control the movements of the head around the horizontal orientation axis 212 and the vertical orientation axis 214 to control selective viewing of the one or more portions of the panoramic visual content.

Figure 3:
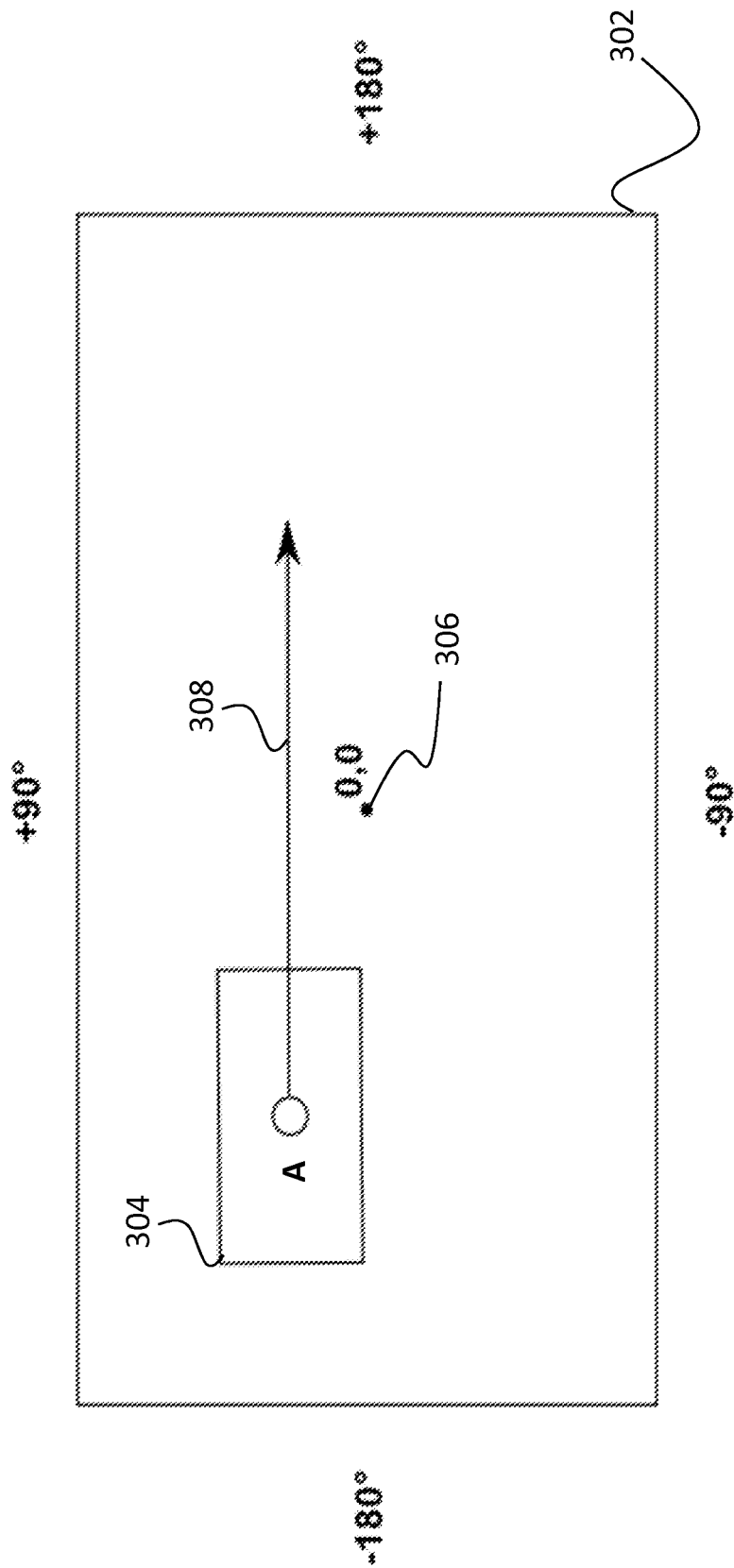
FIG. 3 is an illustration representing a two dimensional view of a spherical panoramic image or video, in accordance with an embodiment of the present disclosure.

FIG. 3 is an illustration representing a two dimensional (2D) view of a spherical panoramic image or video 302. The panoramic image or video 302 has an aspect ratio of 2:1 and covers a 360° horizontal field-of-view (HFOV) and a 180° vertical field-of-view (VFOV). A view point A is determined in a region 304 at a timestamp T1. The view point A is identified using a yaw angle and a pitch angle with reference to centre 306 of the panoramic image 302. As shown, the centre 306 is assigned (0, 0) as coordinates for the yaw angle and the pitch angle respectively. Thus the view point A on the panoramic image 302 can be expressed with only two values: yaw angle (−180° to +180°) and pitch angle (−90° to +90°). Further, an arrow 308 indicates the user's interest to view another portion of the panoramic visual content.

Figure 4B:
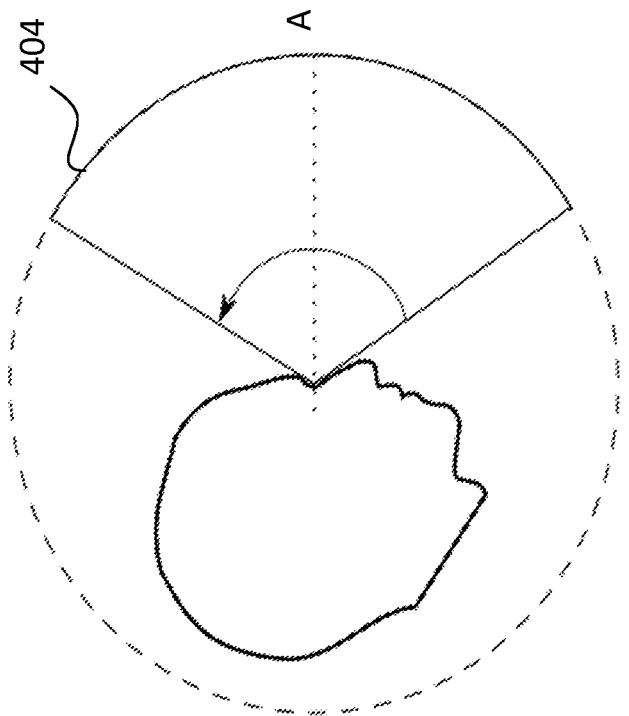
FIGS. 4A-D are schematic illustrations of a viewing range and other computed parameters for a view point identified within the panoramic visual content, in accordance with an embodiment of the present disclosure.
Figure 4A:
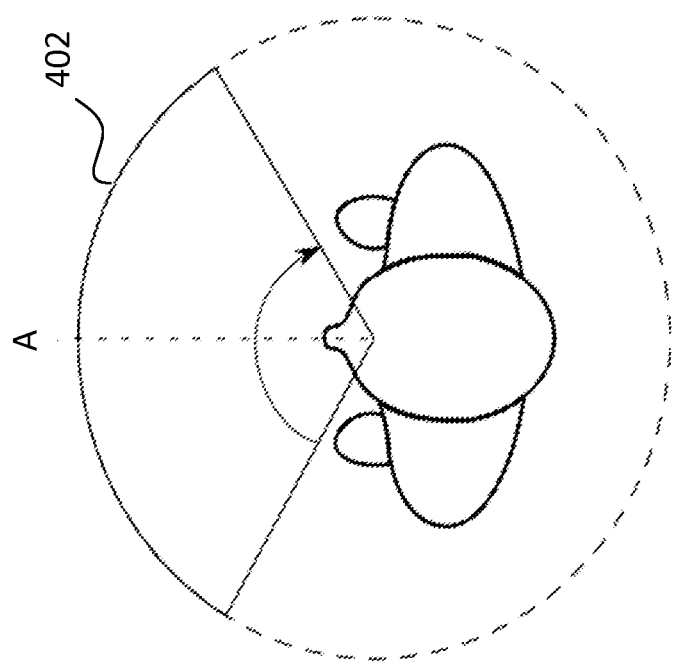
Figure 4D:
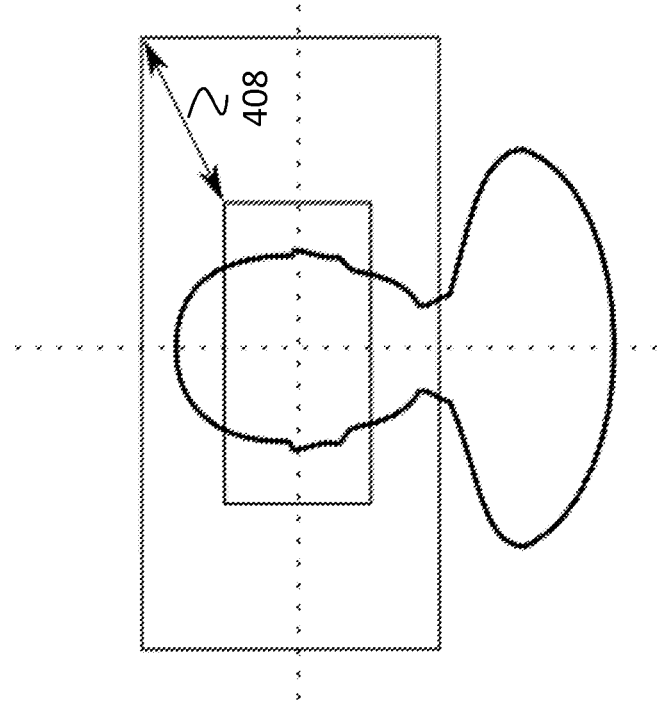
Figure 4C:
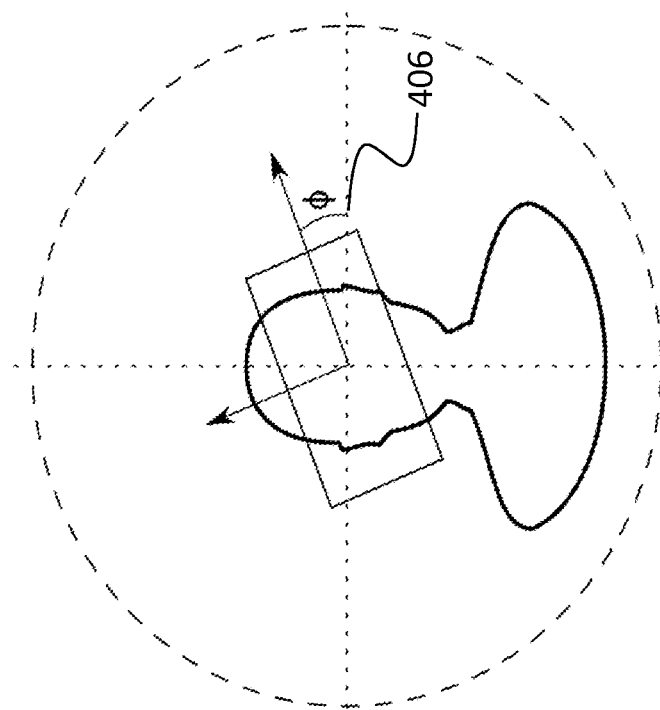

FIGS. 4A and 4B illustrate viewing range for the view point A identified within the panoramic visual content. As shown, a section 402 and a section 404 illustrate the horizontal field of view and vertical field of view respectively on the display area of the device 100 when the user is gazing at the view point A within the panoramic visual content. FIG. 4C illustrates the roll angle 406 associated with the view point A in case the device 100 is tilted. FIG. 4D illustrates the zoom level 408 being used by the user while viewing the panoramic visual content on the display of the device 100.

FIG. 5 illustrates primary and secondary regions of interest which includes the view point A of the panoramic visual content on the display screen 104 of the device 100. The primary region has a relatively higher importance than the secondary region from the user's interest perspective.

Figure 6:
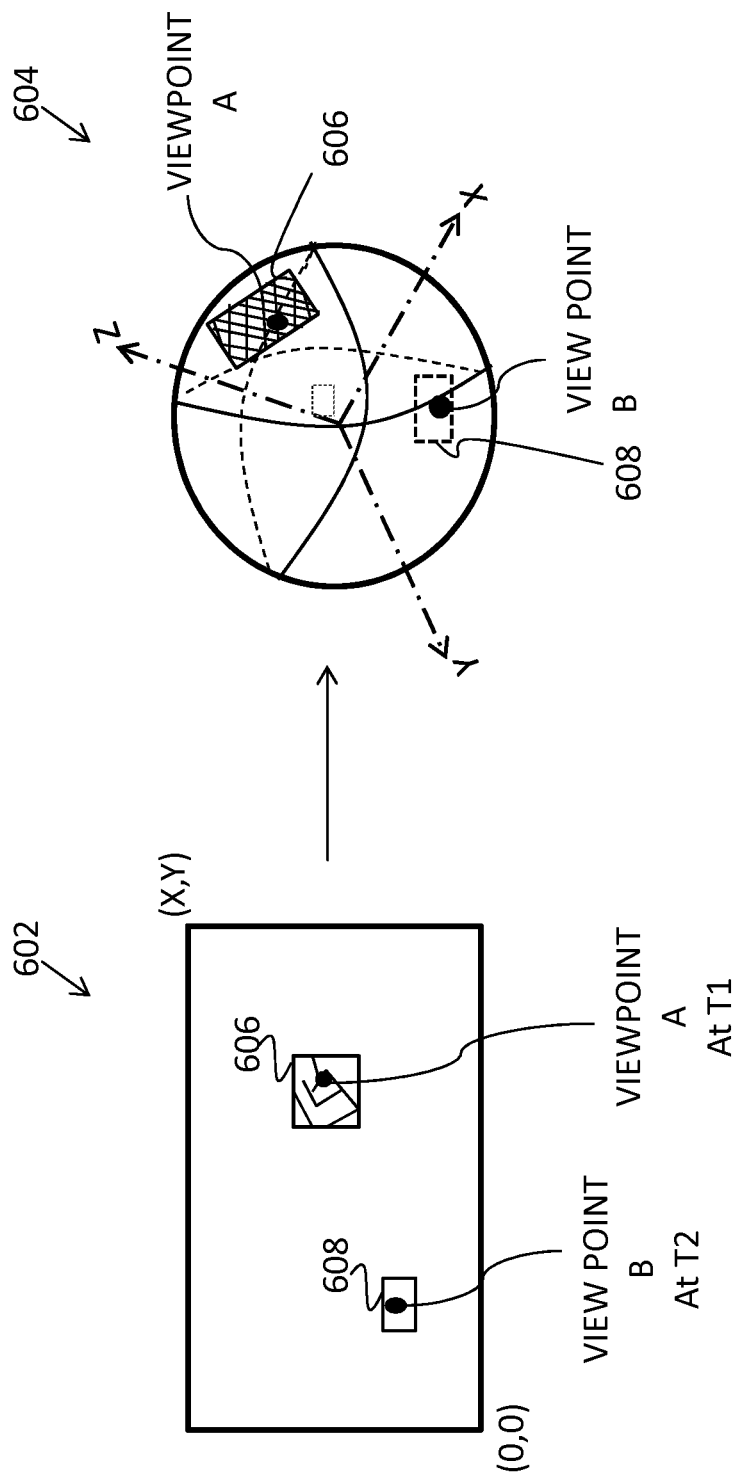
FIG. 6 is an illustration of different view-points and corresponding regions of interest of the user within the panoramic visual content at respective timestamps, in accordance with an embodiment of the present disclosure.

FIG. 6 illustrates different view-points and corresponding regions of interest of the user within the panoramic visual content at different time stamps. A representation 602 indicates a relative position of these view-points when the panoramic visual content is presented on a rectangular display screen of a mobile tablet device. A representation 604 indicates the relative position of these view-points when the panoramic visual content is projected on a screen of a head mounted virtual reality device. The device 100 determines that the user is gazing at view-points A and B at timestamps T1 and T2 respectively. The view point A is found within a primary region 606 and the view point B is found within a primary region 608 of the panoramic visual content at the respective timestamps.

Figure 7B:
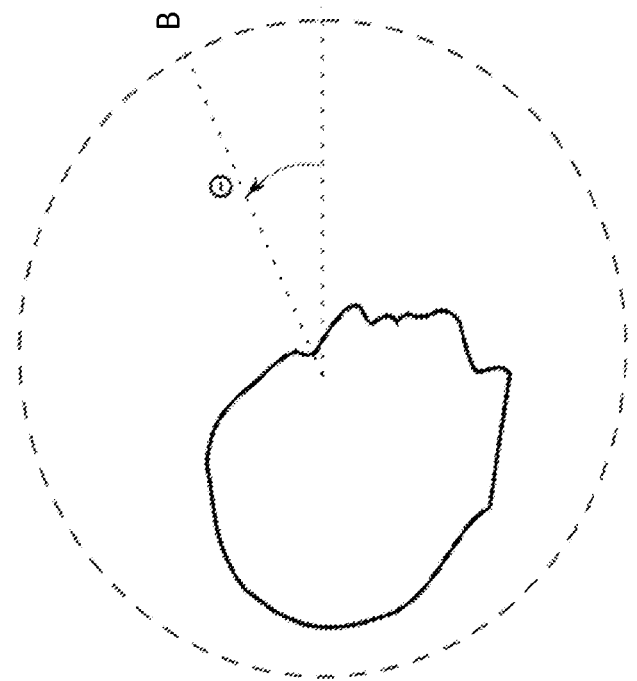
FIGS. 7A-B are schematic illustrations for indicating orientation based displacement between the two view-points which are of interest to the user, in accordance with an embodiment of the present disclosure.
Figure 7A:
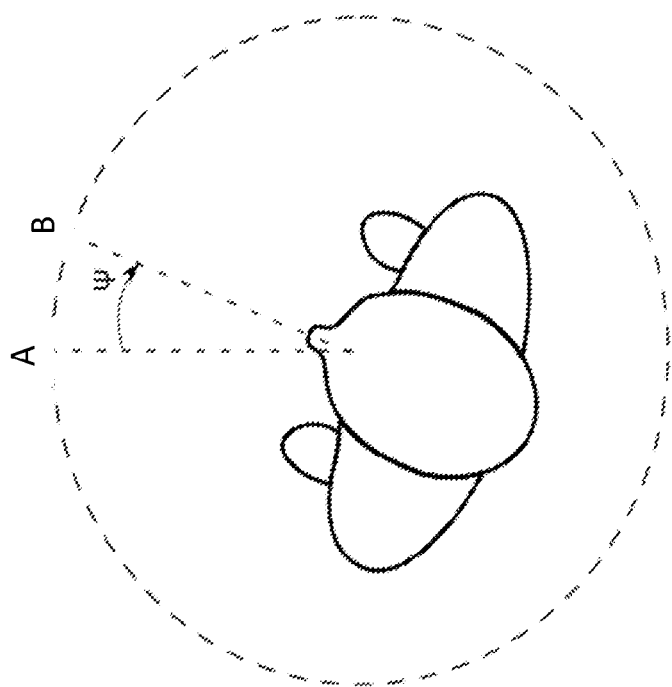

FIGS. 7A and 7B are illustrations indicating orientation based displacement between the two view-points which are of interest to the user. FIG. 7A indicates horizontal orientation based displacement between the view-points A and B, which is determined using the yaw angle ψ. FIG. 7B indicates vertical orientation based displacement between the view-points A and B, which is determined using the pitch angle θ.

Figure 8:
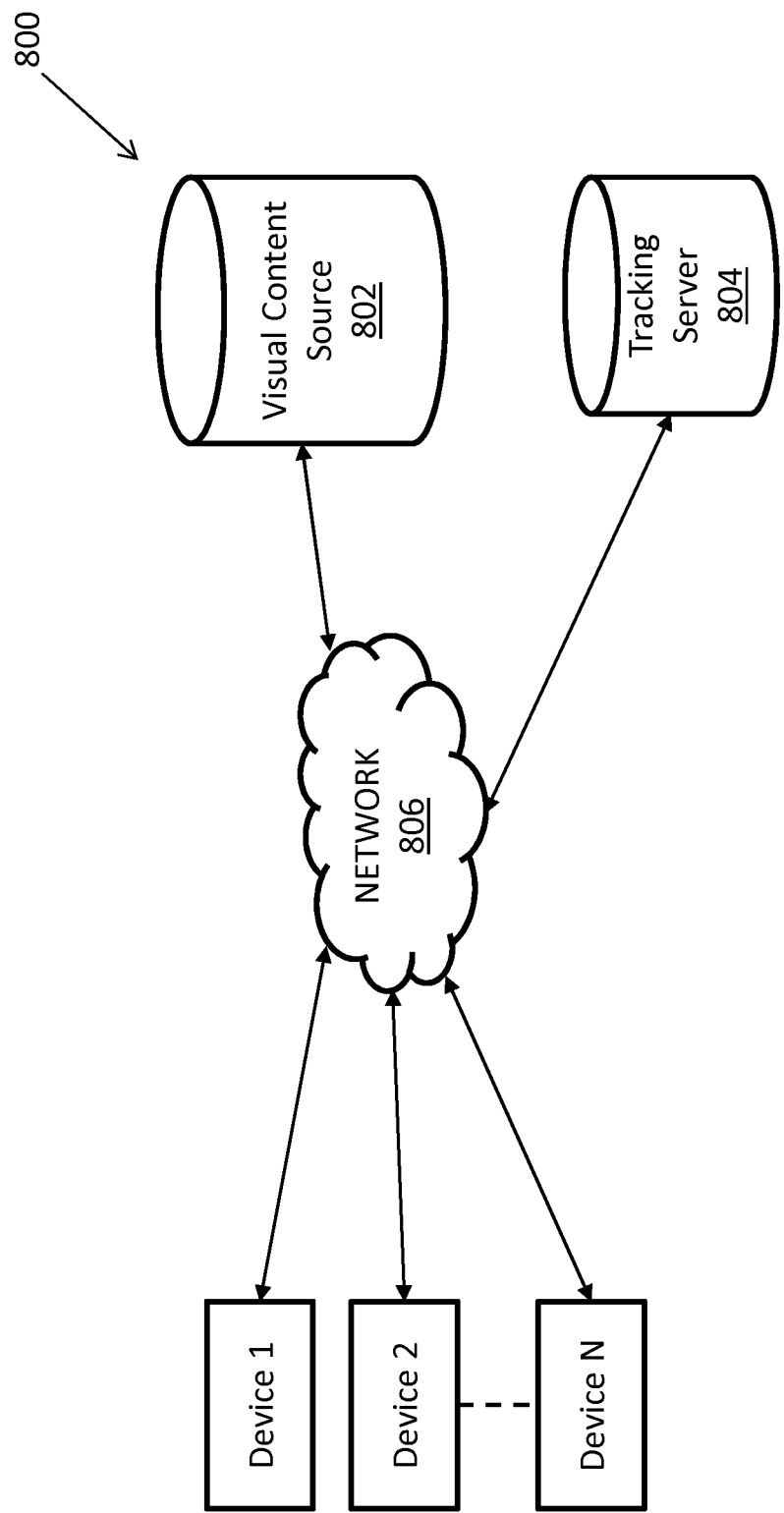
FIG. 8 is an illustration of a system for tracking an interest of a group of users for the panoramic visual content, in accordance with an embodiment of the present disclosure.

FIG. 8 illustrates a system 800 for tracking an interest of a group of users within the panoramic visual content. The system 800 is configured to include one or more user devices such as a device 1, device 2 and device N communicatively coupled to a video content source 802 and a tracking server 804 through a network 806. The user device 1 is configured to access the video content source 802 to retrieve the video content and display the video content in a panoramic view to a first user. The user device 1 tracks the viewing activity of a first user and forwards the viewing activity to the tracking server 804. Similarly, other user devices (such as the device 2 and device N) track the viewing activity of the respective users and forward the tracked information to the tracking server 804. The tracking server 804 is configured to combine the viewing activities of the different users for the video content and generate a heat map indicating a plurality of portions of the panoramic visual content which are of interest to the group of users.

Figure 9:
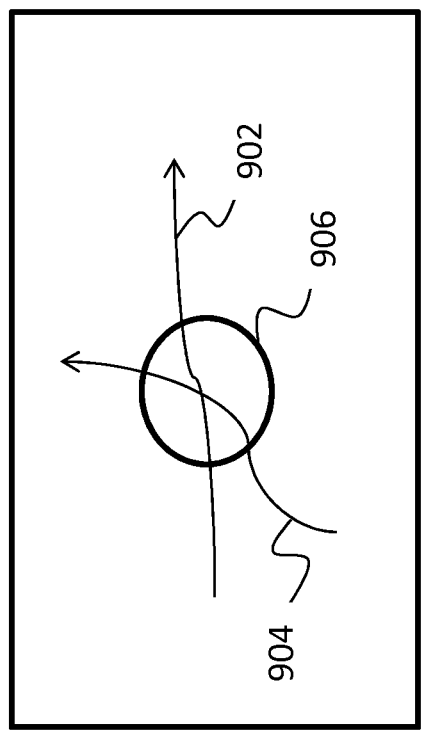
FIG. 9 is an illustration of an interesting portion of the panoramic visual content determined using the viewing activities of the users, in accordance with an embodiment of the present disclosure.

FIG. 9 illustrates an interesting portion of the panoramic visual content determined using the viewing activities of the users. As shown, viewing activity tracks 902 and 904 indicate the view-points within the panoramic visual content which are of interest to a first user and a second user, respectively. The tracking server (such as the tracking server 804 shown in FIG. 8) is configured to determine one or more common portions of interest within the panoramic visual content. The section 906 indicates such common portion within the panoramic visual content which is of interest to the both users, i.e. the common portion of the viewing activity tracks 902 and 904.

Figure 10:
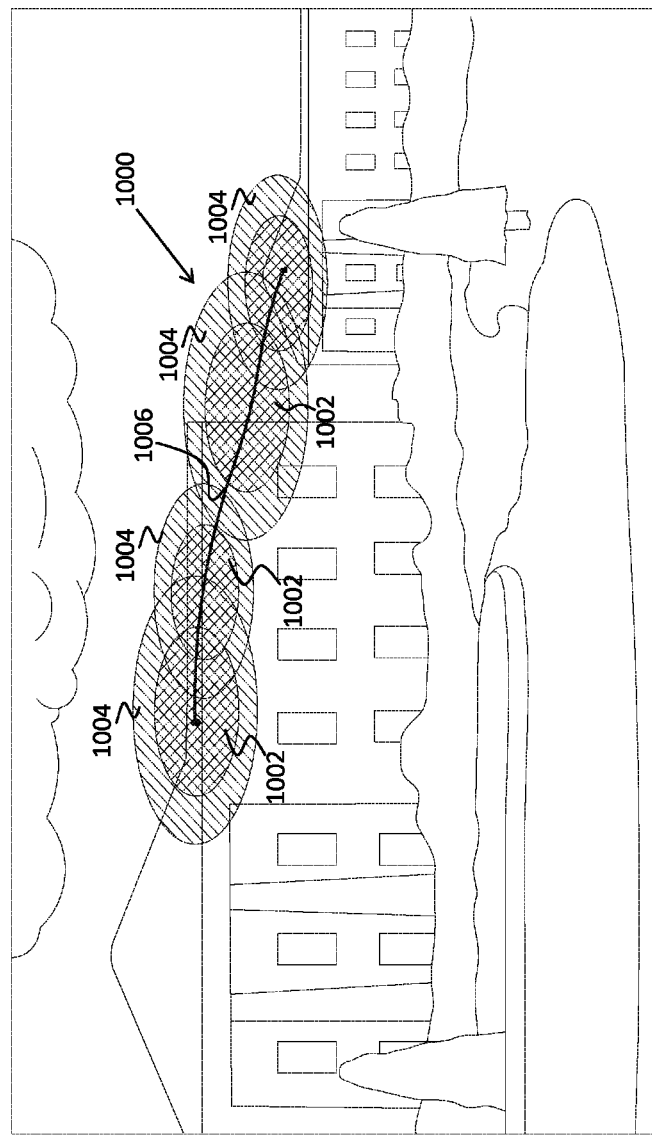
FIG. 10 is an illustration of a heat map indicating portions of the panoramic visual content which are of interest to the group of users, in accordance with an embodiment of the present disclosure.

FIG. 10 illustrates a heat map 1000 indicating portions of the panoramic visual content which are of interest to the group of users. The heat map 1000 is imposed on the panoramic visual content and generated by combining primary regions 1002 and secondary regions 1004 of interest of the group users. As shown, a gaze track 1006 is derived using the view-points common among the group users.

Figure 11:
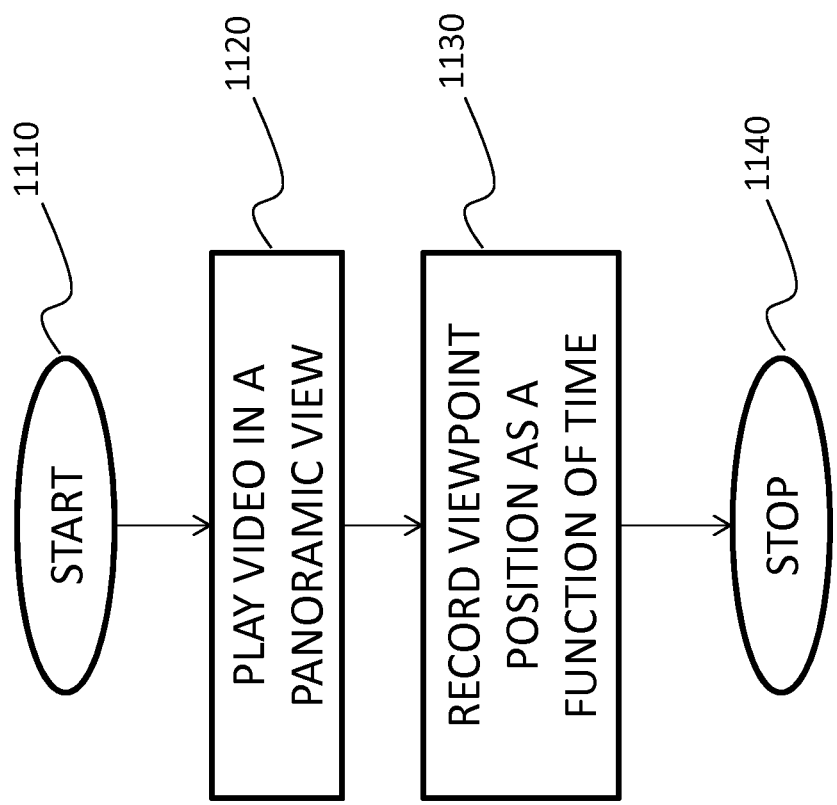
FIG. 11 is an illustration of steps of a method for recording viewing activities of the user, in accordance with an embodiment of the present disclosure.

FIG. 11 is an illustration of steps of a method 1100 for recording viewing activities of the user. The method 1100 illustrates steps involved in the operation of the device 100. The method 1100 initiates at step 1110.

At step 1120, a video is played in a panoramic view to the user.

At step 1130, a position of a view point is recorded as a function of a time. The position record includes one or more orientation parameters of the view point and the dimensions of the region in which the view point is found on the display screen of the device.

At step 1140, the method 1100 terminates.

Figure 12:
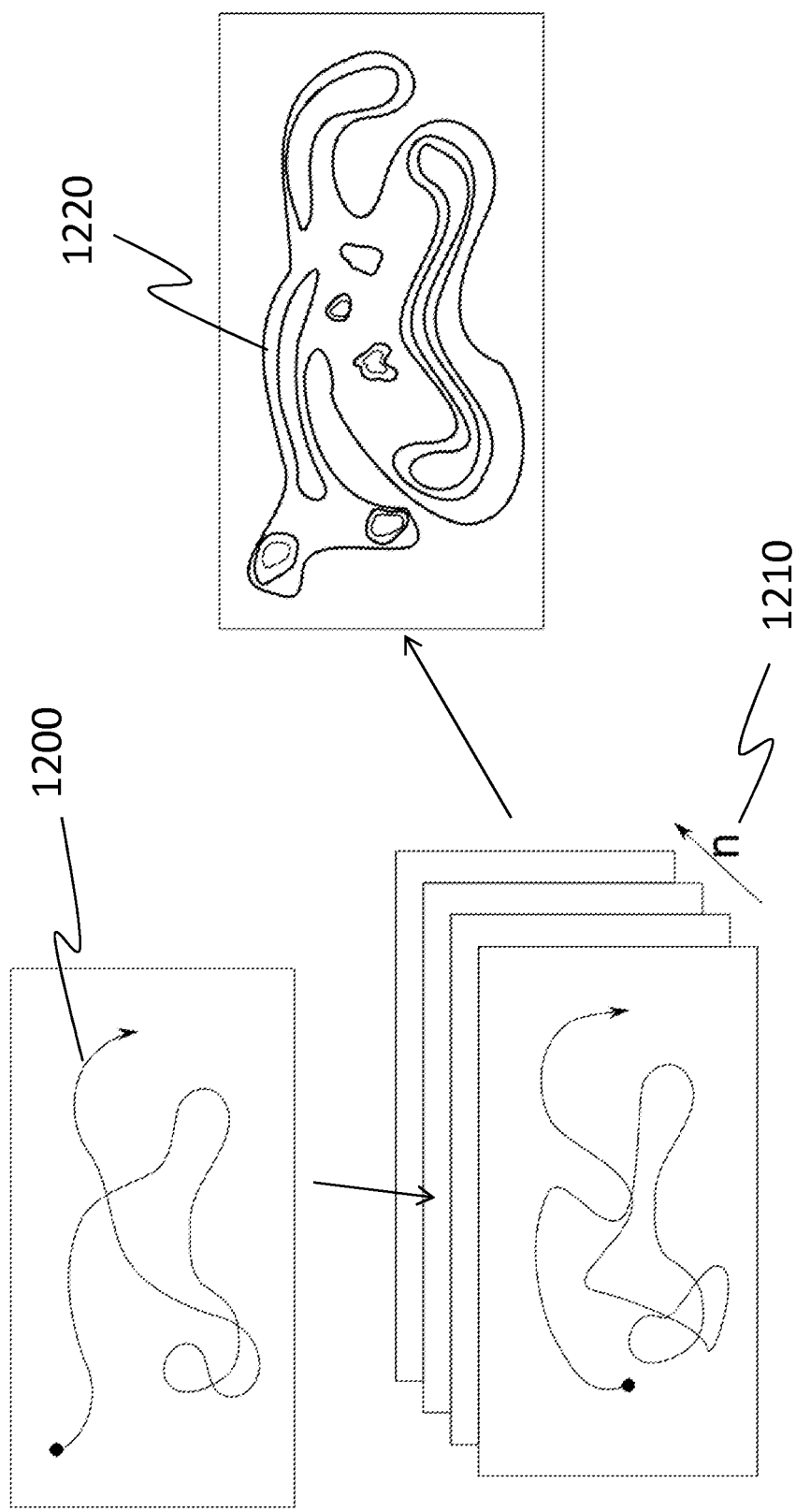
FIG. 12 is an illustration of combining measured heat maps from group of users to a single heat map representing the group of users, in accordance with an embodiment of the present disclosure.

FIG. 12 is an illustration of creation of combined heat map 1220. The combined heat map is created by collecting n gaze tracks 1210 originating from plurality of users such as a gaze track 1200 from one user. The collected n gaze tracks 1210 can be combined for example by assigning cumulative score and making a contour plot of the result as the combined heat map 1220.

Figure 13:
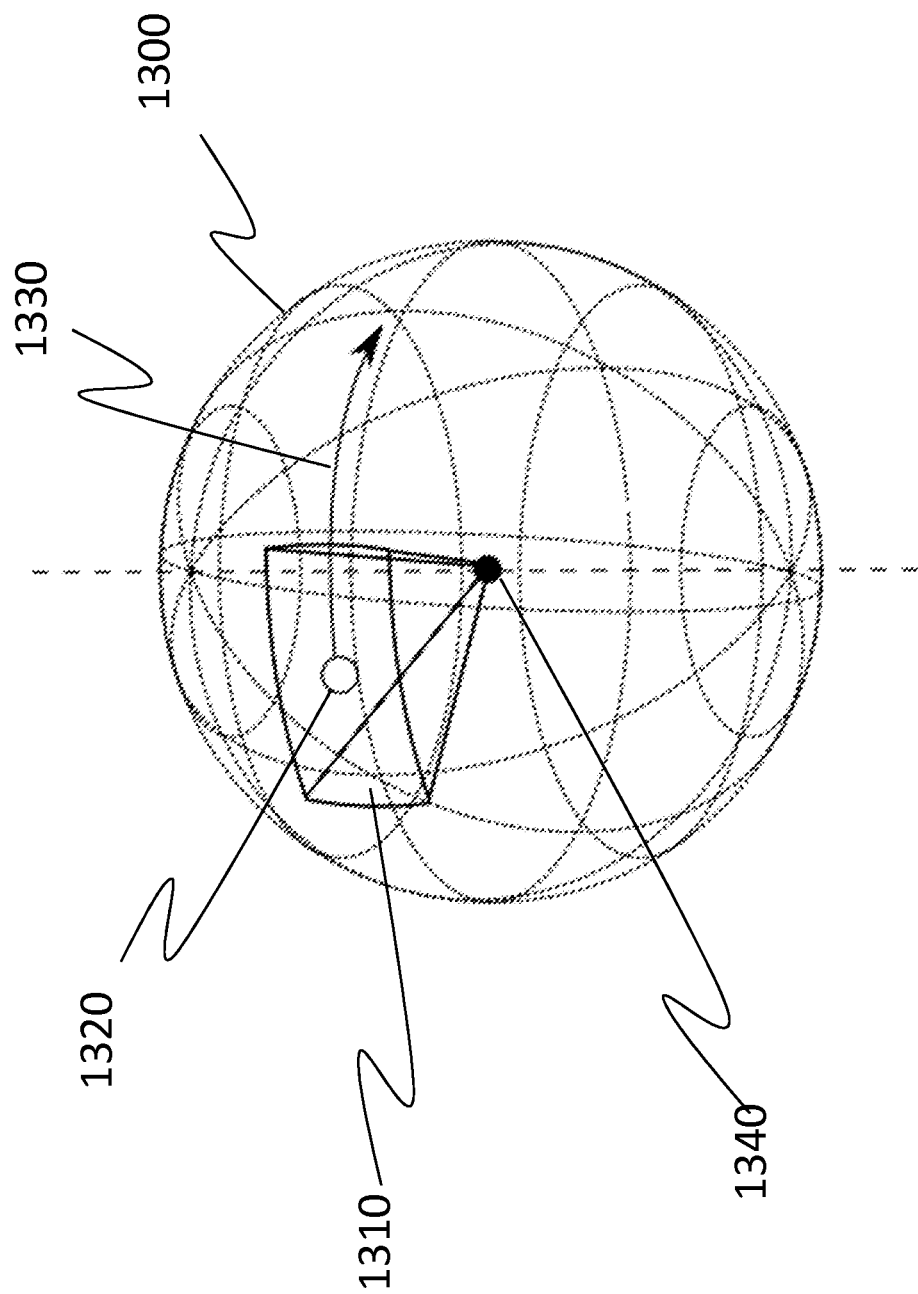
FIG. 13 is an illustration of which part of panoramic audio-visual content is shown in a display of a user, in accordance with an embodiment of the present disclosure.

FIG. 13 is an illustration of a finding a view point 1320 and tracking the view point 1320 in a panoramic audio video. A user device is assumed to be in the middle point 1340. The user device is configured to render a portion of the panoramic audio video. The rendered content of the panoramic audio video content is illustrated with area 1310. As the user changes orientation of the device the area 1310 and the view point 1320 moves as indicated with arrow 1330.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for tracking an interest of a first user within a panoramic visual content, the method comprising:
presenting the panoramic visual content to the first user on a display area of a device;
determining a first view point within the panoramic visual content at a first timestamp, and a second view point within the panoramic visual content at a second timestamp;
determining at least one orientation parameter for the first view point at the first timestamp and the second view point at the second timestamp relative to each other;

computing the interest of the first user within the panoramic visual content using the at least one orientation parameter; and
generating a heat map indicating a track of a plurality of portions of the panoramic visual content which are of interest to the first user, wherein each portion of the plurality of portions of the panoramic visual content is found within at least one region of the display area at different timestamps.

2. The method according to claim 1, further comprising defining a primary region of the display area of the device, wherein at least one of the first view point and the second view point is within the primary region.

3. The method according to claim 2, wherein the primary region indicates a portion of the panoramic visual content which is of interest to the first user.

4. The method according to claim 2, wherein defining the primary region comprises defining dimensions for the primary region, wherein the dimensions comprise at least two of a horizontal field of view, a vertical field of view and an aspect ratio.

5. The method according to claim 1, wherein the least one orientation parameter is selected from a group consisting of a horizontal parameter, a vertical parameter, an axial parameter and combination thereof.

6. The method according to claim 5, wherein the horizontal parameter is a yaw angle, the vertical parameter is a pitch angle and the axial parameter is a roll angle.

7. The method according to claim 1, further comprising:
storing the at least one orientation parameter for the first view point at the first timestamp and the second view point at the second timestamp relative to each other; and
computing eye gazing track of the first user based on the at least one orientation parameter.

8. The method according to claim 1, further comprising:
determining at least one video timing value for the first view point at the first timestamp and the second view point at the second timestamp; and
computing the interest of the first user within the panoramic visual content using the at least one orientation parameter and the at least one video timing value.

9. The method according to claim 1, further comprising transmitting the computed interest of the first user to an interest tracking server.

10. The method according to claim 1, wherein the first view point or second view point corresponds to a point of interest of the first user within the panoramic visual content at the first timestamp or second timestamp respectively.

11. A method for determining interest of users within a panoramic visual content, the method comprising steps of:
receiving interest tracking information of at least two users for the panoramic visual content, wherein the interest tracking information of a first user is determined based on at least one orientation parameter computed for first and second view-points at a first device according to claim 1; and
combining the interest tracking information of the at least two users to generate the heat map, wherein the heat map corresponds to a plurality of portions of the panoramic visual content which are of interest to the at least two users.

12. The method according to claim 11, further comprising:
receiving a request from the first user to access the heat map of the panoramic visual content;
imposing the heat map on the panoramic visual content; and
transmitting the panoramic visual content imposed with the heat map to the first user.

13. A system for determining interest of users within a panoramic visual content, the system comprising:
a first computing device comprising a panoramic visual content tracker configured to:
present the panoramic visual content to a first user on a display area of a device;
determine a first view point within the panoramic visual content at a first timestamp and a second view point within the panoramic visual content at a second timestamp;
determine at least one orientation parameter for the first view point at the first timestamp and the second view point at the second timestamp relative to each other; and
compute the interest of the first user within the panoramic visual content using the at least one orientation parameter;
and
a tracking server configured to:
combine the interest of the first user within the panoramic visual content with an interest of a second user for the panoramic visual content; and
generate a heat map indicating a track of a plurality of portions of the panoramic visual content which are of interest to the first and second users, wherein each portion of the plurality of portions of the panoramic visual content is found within at least one region of the display area at different timestamps.

14. The system according to claim 13, wherein the panoramic visual content tracker is further configured to:
define a primary region on the display area of the device, wherein at least one of the first view point and the second view point is within the primary region.

15. The system according to claim 14, wherein the panoramic visual content tracker is further configured to define dimensions for the primary region, wherein the dimensions comprise at least two of a horizontal field of view, a vertical field of view and an aspect ratio.

16. The system according to claim 13, wherein the at least one orientation parameter is selected from a group consisting of a horizontal parameter, a vertical parameter, an axial parameter and combination thereof.

17. The system of according to claim 16, wherein the horizontal parameter is a yaw angle, the vertical parameter is a pitch angle and the axial parameter is a roll angle.

18. The system according to claim 13, wherein the panoramic visual content tracker is further configured to:
determine at least one video timing value for each of the first and second view-points at the first and second timestamps respectively; and
compute the interest of the first user within the panoramic visual content using the at least one orientation parameter and the at least one video timing value.

19. The system according to claim 13, wherein the tracking server is configured to divide a complete area of the panoramic visual content into a plurality of smaller areas of equal size and assign a value to each of the smaller area, wherein the value assigned to a smaller area is a quantitative indicator of a viewing activity in the smaller area, and wherein an area having a lesser viewing activity relative to an area having a higher viewing activity is mapped to a color that is different than the area having the higher viewing activity.

20. The method according to claim 1, further comprising dividing a complete area of the panoramic visual content into a plurality of smaller areas of equal size and assign a value to each of the smaller area, wherein the value assigned to a smaller area is a quantitative indicator of a viewing activity in the smaller area, and wherein an area having a lesser viewing activity relative to an area having a higher viewing activity is mapped to a color that is different than the area having the higher viewing activity.

* * * * *